(12) United States Patent
Sakuma et al.

(10) Patent No.: US 8,305,681 B2
(45) Date of Patent: Nov. 6, 2012

(54) LIGHT SOURCE APPARATUS

(75) Inventors: Jun Sakuma, Kanagawa (JP); Haruhiko Kusunose, Kanagawa (JP)

(73) Assignee: Lasertec Corporation, Kanagawa (JP)

( * ) Notice: Subject to any disclaimer, the term of this patent is extended or adjusted under 35 U.S.C. 154(b) by 0 days.

(21) Appl. No.: 12/858,848

(22) Filed: Aug. 18, 2010

(65) Prior Publication Data

US 2011/0220815 A1    Sep. 15, 2011

(30) Foreign Application Priority Data

Aug. 19, 2009  (JP) ................... 2009-189912

(51) Int. Cl.
*G02F 1/35* (2006.01)
*G02F 2/02* (2006.01)
*H01S 3/10* (2006.01)

(52) U.S. Cl. ............. 359/326; 372/22; 372/27; 359/328

(58) Field of Classification Search .................. None
See application file for complete search history.

(56) References Cited

U.S. PATENT DOCUMENTS

| 5,144,630 | A | * | 9/1992 | Lin ................................. 372/22 |
| 5,742,626 | A | * | 4/1998 | Mead et al. ..................... 372/22 |
| 2003/0035201 | A1 | * | 2/2003 | Budni .......................... 359/326 |
| 2003/0123159 | A1 | | 7/2003 | Morita et al. | |
| 2010/0296153 | A1 | * | 11/2010 | Jungbluth et al. ............ 359/328 |

FOREIGN PATENT DOCUMENTS

| JP | 9-232665 A | 9/1997 |
| JP | 10-070333 A | 3/1998 |
| JP | 2000-164950 A | 6/2000 |
| JP | 2002-267825 A | 9/2002 |
| JP | 2006-269455 A | 10/2006 |
| WO | WO 2008086790 A1 * | 7/2008 |

* cited by examiner

*Primary Examiner* — Hemang Sanghavi
(74) *Attorney, Agent, or Firm* — Carrier Blackman & Associates, P.C.; Joseph P. Carrier; William D. Blackman

(57) ABSTRACT

The invention is directed to the provision of a wavelength conversion-type ultraviolet light source apparatus that can obtain a stable output. A light source apparatus according to one mode of the invention includes: a laser light source 1 which produces fundamental light L1; at least one nonlinear optical crystal 3 which takes the fundamental light L1 or a harmonic thereof as incident light and outputs wavelength-converted light L2; and polarization adjusting means 2 which is placed in an optical path of the incident light and causes an output of the wavelength-converted light L2 to change by changing its refractive index for a polarized component of the incident light. The polarization adjusting means 2 changes the amount of change of the refractive index in accordance with an electrical signal output from a photodetector 7.

17 Claims, 7 Drawing Sheets

LIGHT SOURCE APPARATUS

BACKGROUND OF THE INVENTION

1. Field of the Invention

The present invention relates to a light source apparatus, and more particularly to a wavelength conversion-type light source apparatus that produces a light beam in the ultraviolet region of the spectrum using a nonlinear optical crystal.

2. Description of the Related Art

In the manufacturing process of a photomask plate for semiconductor exposure apparatus, for which a fine processing is required, it becomes necessary to inspect microscopic defects that may be contained in the plate. Further, in the case of a reticle on which a fine exposure pattern is written, an inspection must be performed to check whether the actual pattern is written correctly and whether there are any defects on the pattern.

For such purposes, semiconductor defect inspection equipment wherein the object under inspection is illuminated with continuous or high repetition pulsed light and changes in light intensity due to scattering, etc., for comparison are detected, is used. Such semiconductor defect inspection equipment is available in a variety of types, but regardless of the type, the resolution generally increases as the wavelength of the light source is made shorter. Accordingly, the light source apparatus of the type that produces inspection light in the deep ultraviolet region of the spectrum by wavelength conversion using nonlinear optical crystals has come into wide use in recent years.

However, if highly coherent light is used for semiconductor inspection, an unevenness in the spatial distribution of the light intensity, called speckle, will occur. As a result, it is desirable, as pointed out, for example, in Japanese Unexamined Patent Publication No, 2006-269455, to use ultraviolet light whose coherence is not very high, and therefore to use a longitudinal multimode laser which operates in a plurality of longitudinal modes as the fundamental light source.

As one of light sources that satisfy such requirements, a light source that uses an argon-ion laser, which continuously oscillates at 515 nm or 488 nm, and produces second-harmonic light (257 or 244 nm) by wavelength conversion in an internal resonator is proposed.

A light source that produces a 198.5-nm continuous output by sum-frequency mixing between 244-nm light as the second harmonic of an argon-ion laser and 1064-nm light from an Nd:YAG laser or the like has been developed. However, the argon-ion laser not only has an extremely poor oscillation efficiency and requires large power to operate, but also has a major problem in terms of maintenance since it requires frequent replacement of the gas laser tube.

In view of the above, vigorous research and development has been conducted in recent years to develop deep ultraviolet light sources of all-solid construction smaller in size and easier to maintain, examples of which include light sources that produce the fourth harmonic (266 nm) or the fifth harmonic (213 nm) of an Nd:YAG laser or Nd:YVO4 laser (1064 nm) and those that emit 193.4-nm light by generating the eighth harmonic of an erbium-doped fiber laser that emits 1540-nm light.

To produce deep ultraviolet light from the infrared light of a longitudinal multimode Nd:YAG laser or fiber laser or the like, at least two stages of wavelength conversion become necessary. It is therefore difficult, in principle, to place a nonlinear optical crystal for ultraviolet generation inside a laser resonator or an external resonator. To achieve a light source having a practical output, an infrared laser having a high peak intensity, for example, a high-output laser light source that produces highly repetitive pulses by mode-locking, is suitable for application.

In the case of deep ultraviolet light sources of 266 nm or shorter wavelengths, generally the efficiency of conversion from the input light to the output light decreases over time due to the optical damage or deterioration of the nonlinear optical crystal, regardless of the type of output light generation. It is therefore necessary to stabilize the output by increasing the input light power so as to compensate for the decrease. Usually, stabilization control is performed using an APC (Automatic Power Control) circuit by separating a portion of the output light and measuring its intensity and by increasing or reducing the output of the pump laser to compensate for the decrease or increase in the intensity of the output light.

A light source for semiconductor inspection requires not only long-term stability but also short-term output stability on the order of kilohertz in the frequency band, i.e., the suppression of high-frequency optical noise. Optical noise in wavelength-converted light has been a major problem to be solved in the development of a small-output green or blue light source in which a wavelength conversion crystal is placed inside the resonator of an internal resonator-type laser light source.

As a method for suppressing the noise, measuring a portion separated from the output and to feed the measurement back to the current to be supplied to the semiconductor pump laser has been proposed, for example, in Japanese Unexamined Patent Publication No. 9-232665, Japanese Unexamined Patent Publication No. 10-70333, etc.,. Since this method is directed to an electrical control, it is also possible to compensate for high-frequency optical noise. Various means are also known, such as the installation of a wave plate, the application of phase compensation, etc., which compensate for the mode competition within the resonator that causes optical noise peculiar to the internal resonator type.

For an ultraviolet light source used in semiconductor inspection equipment that detects defects by capturing subtle differences in the changing intensity of the laser light illuminating the object under inspection, it is important that short-term and long-term optical output fluctuations be small. For a similar reason, uniformity in the spatial distribution of the light intensity over the illuminated surface is also important.

The conversion efficiency of a wavelength conversion-type light source using a nonlinear optical crystal depends on the square of the intensity of input light (in the case of harmonic generation) or on the product of the intensities of two input lights (in the case of sum-frequency generation). As a result, if there is an output variation of 1% in the fundamental light, for example, it will result in an output variation of 4% in the case of fourth-harmonic generation which requires two stages of wavelength conversion.

If the output is to be stabilized by controlling the driving current of the semiconductor pump laser, as in the case of a conventional small-sized visible light source that performs wavelength conversion within a resonator, the amount of light absorbed into the laser medium changes, and the profile and the spreading angle of the output light change because of the change in the distribution of the refractive index of the laser medium, which is referred to as the thermal lens effect. As a result, the efficiency of wavelength conversion into the ultraviolet region drops, and the profile and the spreading angle of the resulting ultraviolet light change, rendering the method unsuitable for the purpose.

Further, in the case of a light source apparatus that employs as the fundamental light source a mode-locked laser using a semiconductor saturable mirror, which is currently the predominant type, if the pump light power is reduced, mode-locking cannot be maintained; therefore, in this case also, the method of controlling the output by adjusting the current of the semiconductor pump laser is not practicable.

If ultraviolet light is produced by nonlinear wavelength conversion using a longitudinal multimode light source that does not easily yield speckle as the fundamental light source, sum-frequency mixing occurs due to competition between longitudinal modes, and the problems that the fluctuation of the produced ultraviolet light output increases become pronounced. The aforementioned means, such as the installation of a wave plate, the application of phase compensation, etc., in the internal resonator-type wavelength conversion, are not effective in the case of a light source that produces ultraviolet light by higher-order harmonic generation which requires the provision of one or more nonlinear optical crystals outside the resonator.

As a means for eliminating or suppressing speckle, it is also effective to provide an optical means for degrading its spatial coherence. For example, Japanese Unexamined Patent Publication No. 2002-267825 discloses a rotating diffusion plate such as frosted glass or a diffractive lens element for use as such an optical means. However, if such a modulation element is used, the light output passing through the element fluctuates, if only slightly, with a period equal to the modulation, and this fluctuation can cause optical noise. Even when the amount of fluctuation is as small as about 2%, for example, it presents a non-negligible problem in the case of a light source for semiconductor inspection.

Japanese Unexamined Patent Publication No. 2000-164950 discloses an apparatus in which an attenuator constructed by combining a wave plate with a polarizer is placed between a laser light source and a nonlinear optical crystal. However, in this apparatus, the fluctuation of light that can be suppressed by rotating the wave plate is of one second order at most, and it cannot address kilohertz order optical noise.

Providing an apparatus called a noise eater for the elimination of conventional optical noise in laser light is also known. In this apparatus, an attenuator is constructed by combining an electro-optical crystal or the like with a polarizer, and feedback control is performed so as to stabilize the output of the light transmitted through the polarizer.

In such an apparatus, the optical transmitting power is basically fixed to a level not higher than the minimum value of the fluctuating output, and the optical loss of the polarizer is rather large; as a result, the laser light output drops to about 85% at the maximum. Furthermore, in the wavelength conversion, if the output of the pump light source is stabilized using a noise eater, it is not possible to eliminate optical noise that occurs during the wavelength conversion process such as the generation of sum-frequency due to longitudinal mode competition, nor is it possible to eliminate optical noise that arises from the means for degrading the spatial coherence affecting the wavelength-converted light.

SUMMARY OF THE INVENTION

The present invention has been made in view of the above-described problems, and an object of the invention is to provide a light source apparatus that can obtain a stabilized wavelength-converted light output.

A light source apparatus according to a first mode of the invention is comprised of a laser light source which produces fundamental light; at least one nonlinear optical crystal which receives the fundamental light or a harmonic thereof as incident light and outputs wavelength-converted light; and polarization adjusting means which is placed in an optical path of the incident light and causes an output of the wavelength-converted light to change by changing its refractive index for a polarized component of the incident light. In this arrangement, since the polarization of the incident light is adjusted by the polarization adjusting means before the incident light is fed into the nonlinear optical crystal, it becomes possible to stabilize the output of the wavelength-converted light.

A light source apparatus according to a second mode of the invention, which is identical to the light source apparatus described above, further includes a light output measuring device which converts the output of the wavelength-converted light into an electrical signal output, wherein the polarization adjusting means changes the amount of change of the refractive index in accordance with the electrical signal output from the light output measuring device. In this arrangement, since the refractive index of the polarization adjusting means can be changed as the wavelength-converted light changes, it becomes possible to stably maintain the output of the wavelength-converted light.

A light source apparatus according to a third mode of the invention, which is identical to the light source apparatus described above, further includes a phase retardation plate which is placed in the optical path of the incident light and by which the polarized component of the incident light that is to enter the nonlinear optical crystal and contribute the wavelength conversion therein is adjusted so that an electrical signal applied to the polarization adjusting means is maintained substantially constant. In this arrangement, since the electrical signal applied to the polarization adjusting means can be maintained substantially constant, it becomes possible to reduce power consumption.

A light source apparatus according to a fourth mode of the invention, which is identical to any one of the light source apparatuses described above, further includes an optical means placed in the optical path of the incident light, to degrade the spatial coherence of the wavelength-converted light. Even when this kind of optical means for degrading the spatial coherence is provided in order to reduce speckle, it becomes possible to obtain the wavelength-converted light of stable output.

A light source apparatus according to a fifth mode of the invention, which is identical to the light source apparatus described above, is characterized in that the optical means includes a rotatably driven optical element, a liquid crystal spatial light modulator, or a deformable mirror. The present invention is particularly effective in such cases.

A light source apparatus according to a sixth mode of the invention, which is identical to the light source apparatus described above, is characterized in that the polarization adjusting means is an optical device that changes its refractive index by the photoelastic effect or the electro-optical effect. The present invention can be implemented by using such polarization adjusting means.

A light source apparatus according to a seventh mode of the invention, which is identical to the light source apparatus described above, is characterized in that the wavelength of the fundamental light is in the range of 1030 to 1080 nm, the wavelength-converted light is ultraviolet light of 270 nm or shorter produced by fourth-harmonic generation, and the polarization adjusting means acts on the fundamental light or the second harmonic thereof.

A light source apparatus according to an eighth mode of the invention, which is identical to the light source apparatus described above, is characterized in that the wavelength of the fundamental light is in the range of 1030 to 1080 nm, the wavelength-converted light is ultraviolet light of 216 nm or shorter produced by sum-frequency mixing between the fundamental light and the fourth harmonic thereof, and the polarization adjusting means acts on the fundamental light or the second harmonic or fourth harmonic thereof.

A light source apparatus according to a ninth mode of the invention, which is identical to the light source apparatus described above, is characterized in that the laser light source produces the fundamental light by longitudinal multimode. The present invention is particularly effective in such cases.

According to the present invention, it becomes possible to provide a light source apparatus that can obtain a stabilized wavelength-converted light output.

DESCRIPTION OF THE PREFERRED EMBODIMENTS

Figure 1:
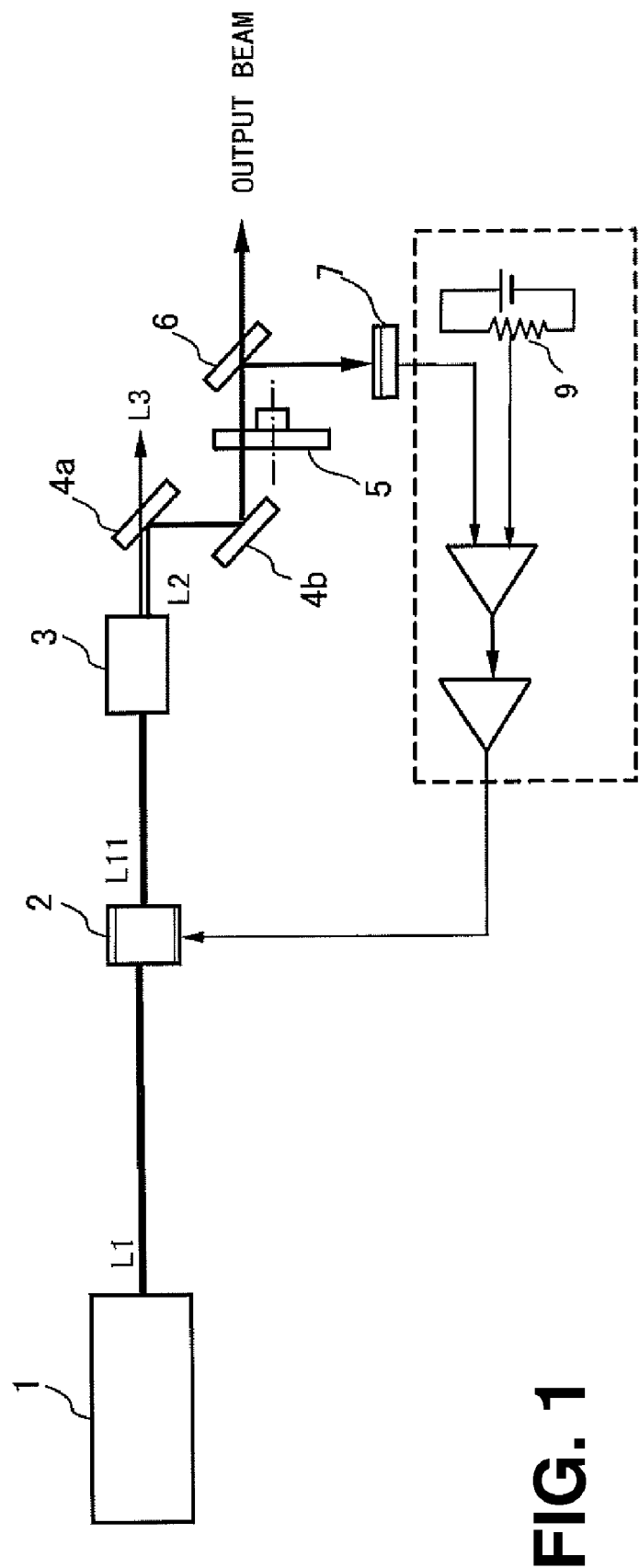
FIG. 1 is a diagram showing the configuration of a light source apparatus according to a first embodiment.

Embodiments of the present invention will be described with reference to the drawings. The following describes the preferred embodiments of the present invention, but it should be understood that the scope of the present invention is not limited by the specific embodiments described herein. In the following description, essentially the same elements are designated by the same reference numerals.

Embodiment 1

Figure 2:
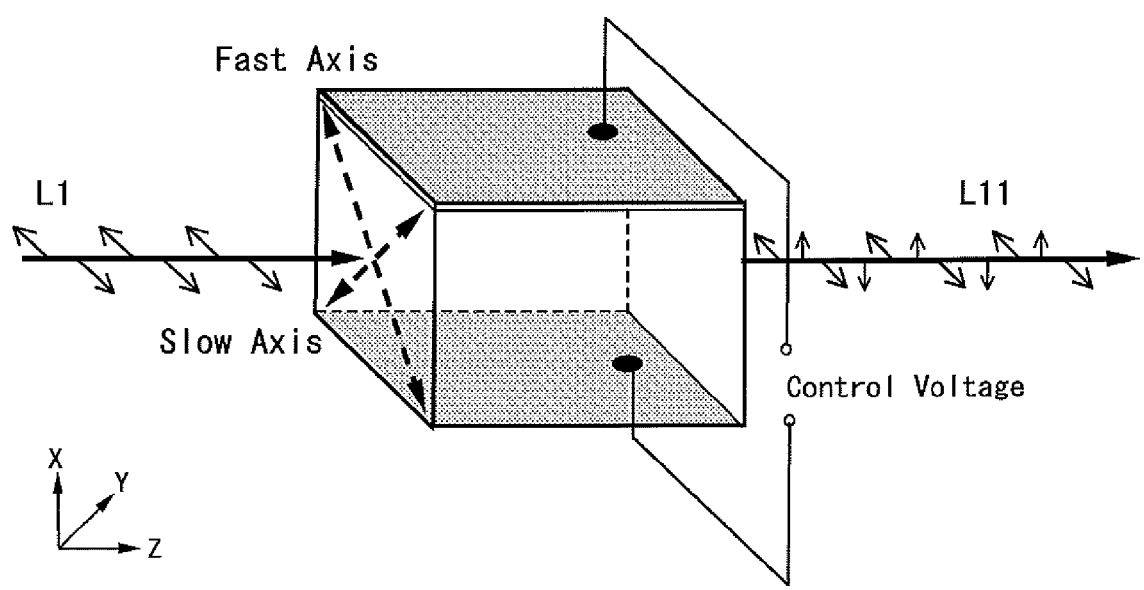
FIG. 2 is a diagram showing the configuration of a polarization adjusting means used in the light source apparatus according to the first embodiment.

The configuration of a light source apparatus according to a first embodiment of the present invention will be described below with reference to FIGS. 1 and 2. FIG. 1 is a diagram showing the configuration of the light source apparatus according to the first embodiment. FIG. 2 is a diagram showing the configuration of a polarization adjusting means used in the light source apparatus according to the first embodiment. As shown in FIG. 1, the light source apparatus includes, in addition to the polarization adjusting means 2, a laser light source 1, a nonlinear optical crystal 3, dichroic mirrors 4a and 4b, a spatial coherence degrading means 5, a partially reflective mirror 6, a photodetector 7, a controller 8, and a reference voltage generator 9.

The present invention concerns a wavelength conversion-type light source apparatus that produces light in the ultraviolet region of the spectrum using a nonlinear optical crystal, and the invention aims to achieve, for use in such a light source apparatus, a low-noise, high-stability, and high-output light source that is suitable for such purposes as illumination in semiconductor inspection equipment.

Laser light L1 from the laser light source 1 passes through the polarization adjusting means 2 and enters the nonlinear optical crystal 3 for wavelength conversion. The light entering the nonlinear optical crystal 3 is converted into light in the ultraviolet region and emerges as wavelength-converted light L2. A portion of the wavelength-converted light L2 is separated by the partially reflective mirror 6 acting as an optical splitting means, and enters the photodetector 7. An electrical signal output from the photodetector 7 provides a signal source for the polarization adjusting means 2. Each component element will be described in detail below.

The laser light source 1 produces the laser light L1 of fundamental wavelength. The laser source 1 is a solid state laser which may be selected from a group of a Nd:YAG laser, a Nd:YVO laser, Nd:YLF laser, and a fiber laser. The wavelength of the laser light L1 lies in the infrared region ranging from 1030 to 1080 nm. The laser oscillation system of the laser light source 1 employed here is a pulse oscillation system with a repetition rate of 200 kHz or higher necessary for semiconductor inspection. The laser light L1 emitted from the laser light source 1 is linearly polarized light. In the present embodiment, it is assumed that the direction of polarization of the laser light L1 is perpendicular to the plane of FIG. 2, as illustrated.

The polarization adjusting means 2 is one that changes its refractive index for the polarized components of the incident laser light L1. The polarization adjusting means 2 used in this embodiment is an optical device that causes its refractive index to change by utilizing the electro-optical effect. For example, as the polarization adjusting means 2, an electro-optical modulator may be used. The electro-optical modulator comprises $LiNbO_3$, RTP, KTP, BBO or KDP. The refractive index of the polarization adjusting means 2 changes as the electric field applied to the polarization adjusting means 2 changes in response to the electrical signal applied from the controller 8 to be described later. The polarization adjusting means 2 is placed in the optical path of the incident light directed to the nonlinear optical crystal 3.

As shown in FIG. 2, the polarization adjusting means 2 has a slow axis and a fast axis. That is, the polarization adjusting means 2 exhibits the property of double refraction. More specifically, the refractive index of the polarization adjusting means 2 differs depending on the vibrating direction of light. In the polarization adjusting means 2, the direction having the lower refractive index is called the fast axis, and the direction having the higher refractive index and oriented at right angles to the fast axis is called the slow axis.

In FIG. 2, the fast axis is denoted by x, the slow axis by y, and the traveling direction of the incident light by z. When the light is incident with its plane of polarization tilted at about 45° relative to the x and y axes, the light is decomposed into a polarized component parallel to the fast axis and a component parallel to the slow axis in the polarization adjusting means 2, and these components pass through the polarization adjusting means 2 at respectively different refractive indexes.

Since a phase difference occurs between the polarized component parallel to the slow axis and the polarized component parallel to the fast axis, the light emerging as laser light L11 from the polarization adjusting means 2 is elliptically polarized. The difference in the refractive index between the slow axis and the fast axis changes as the electric field applied to the polarization adjusting means 2 changes.

As a result, the ellipticity and the ellipse azimuth angle of the elliptically polarized light emerging from the polarization adjusting means 2 change, thus, changing the amount of the polarized component that contributes to the wavelength conversion in the nonlinear optical crystal 3 described hereinafter. The output of the wavelength-converted light L2 emerging from the nonlinear optical crystal 3 can be changed in this manner. Polarized components other than the polarized component that contributes to the wavelength conversion do not contribute to the wavelength conversion in the nonlinear optical crystal 3.

The nonlinear optical crystal 3 takes the fundamental light or a harmonic thereof as incident light from the laser light source 1, and produces the wavelength-converted light. In the example of FIG. 1, only one nonlinear optical crystal 3 is shown, but actually, a plurality of nonlinear optical crystals are provided. The nonlinear optical crystal 3 converts the laser light L11 to produce the wavelength-converted light of 270 nm or shorter wavelength falling in the ultraviolet region of the spectrum.

Here, it is assumed that the nonlinear optical crystal 3 is constructed to perform the wavelength conversion by phase matching to the component polarized in the direction parallel to the plane of polarization of the incident laser light L1 shown in FIG. 2. That is, it is assumed that the polarized component that contributes to the wavelength conversion in the nonlinear optical crystal 3 is polarized in the direction parallel to the plane of polarization of the incident laser light L1 shown in FIG. 2. By applying control voltage to the polarization adjusting means 2, the polarized component perpendicular to the plane of polarization of the incident light increases. In this way, the output of the wavelength-converted light L2 to be produced by the nonlinear optical crystal 3 can be decreased, and thus the output of the wavelength-converted light can be controlled.

A polarizer may be provided on the exit side of the polarization adjusting means 2. In that case, the polarizer is oriented so as to transmit therethrough the polarized component of the incident light that contributes to the wavelength conversion in the nonlinear optical crystal 3. The polarizer blocks the passage of any component that does not contribute to the wavelength conversion in the nonlinear optical crystal 3. The polarization adjusting means 2 and the polarizer together constitute an optical attenuator.

The transmittance T of the laser light L11 elliptically polarized by the polarization adjusting means 2 and passed through the polarizer is expressed as shown by the following equation (1).

$$T = \sin^2\left(\frac{\Gamma}{2}\right) = \sin^2\left(\frac{\pi}{2}\frac{V}{V_\pi}\right) \quad (1)$$

where $\Gamma$ represents the phase difference.

In the above equation, $V_\pi$ is the half-wave voltage at which the phase difference is 180°. By applying voltage to the polarization adjusting means 2, the polarized component perpendicular to the plane of polarization of the incident light increases, and at $V=V_\pi$, the transmittance is maximum, i.e., 1.

If the nonlinear optical crystal 3 is constructed to perform the wavelength conversion by phase matching to this polarized component, the output of the wavelength-converted light to be produced by the nonlinear optical crystal can be changed by changing the voltage applied to the polarization adjusting means 2. Here, since the polarized components that are not allowed to pass through the polarizer are the components that do not contribute to the wavelength conversion, the wavelength-converted output can still be changed if the polarizer is omitted.

The wavelength-converted light L2 produced by the nonlinear optical crystal 3 is reflected by the dichroic mirror 4a and is thus separated from the residual fundamental light L3 remaining unconverted. Then, the wavelength-converted light L2 is reflected by the dichroic mirror 4b and output by passing through the spatial coherence degrading means 5 and the partially reflective mirror 6.

The spatial coherence degrading means 5 degrades the coherence of the incident wavelength-converted light L2 and removes speckle. The spatial coherence degrading means 5 can be constructed using an optical device, such as a rotating diffusion plate or a diffractive lens element, that can be rotated by a motor or the like. It is also possible to use a liquid crystal spatial light modulator or a deformable mirror as the spatial coherence degrading means 5.

A portion of the wavelength-converted light L2 is reflected by the partially reflective mirror 6. The reflected portion of the wavelength-converted light L2 falls on the photodetector 7. The photodetector 7 converts the incident wavelength-converted light L2 into an electrical signal (voltage signal) which is supplied to the controller 8. The reference voltage generator 9 generates a voltage that sets a target value.

The controller 8 takes the voltage from the reference voltage generator 9 as the target value, and controls the voltage to be applied to the polarization adjusting means 2 by applying appropriate negative feedback to the difference between the output of the photodetector 7 and the target value. That is, the controller 8 controls the voltage to be applied to the polarization adjusting means 2 so that the output voltage of the photodetector 7 becomes substantially equal to the target value set by the reference voltage generator 9.

In this way, the output voltage of the photodetector 7 is maintained substantially equal to the target value set by the reference voltage generator 9, and the output of the wavelength-converted light L2 can thus be maintained substantially constant. Thus, according to the present invention, a long-term output fluctuation can be suppressed. Furthermore, since the polarization adjusting means 2 is constructed from an optical device that utilizes the electro-optical effect, it becomes possible to compensate for high-frequency noise on the order of kilohertz, including the optical noise that occurs when a spatial coherence degrading device such as a rotating diffusion plate is used.

Figure 3:
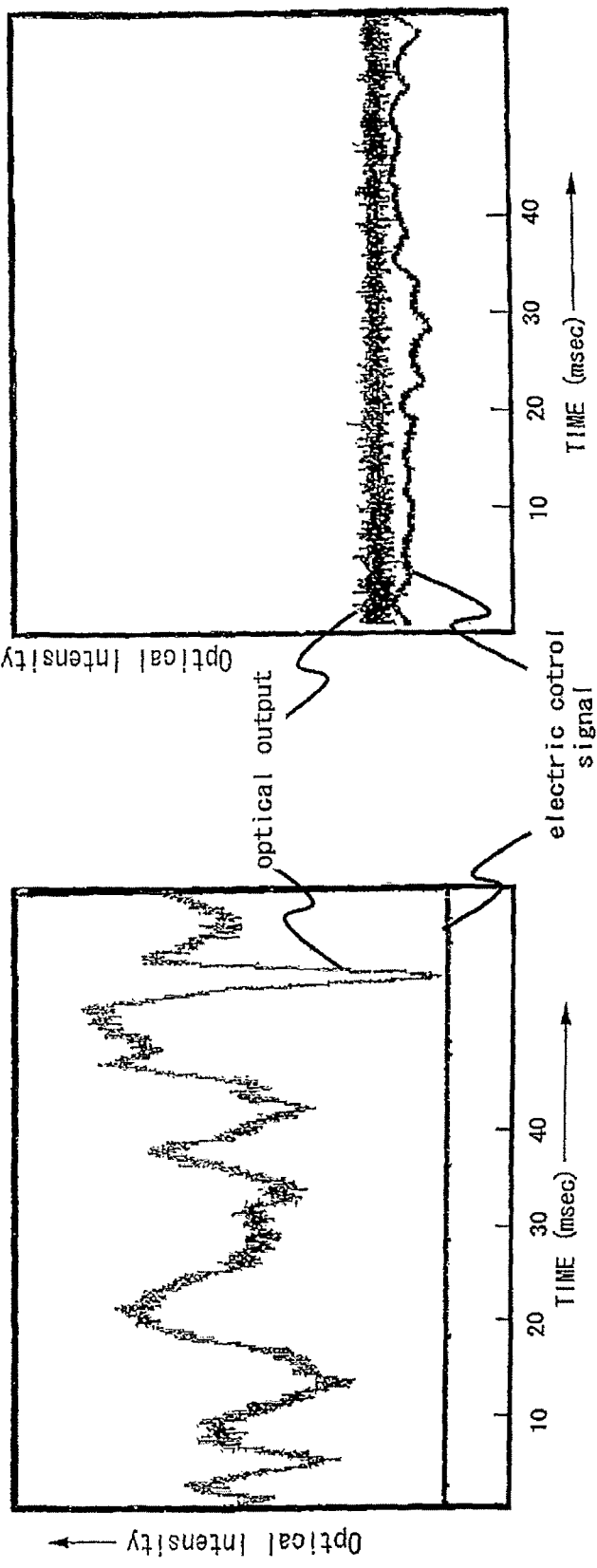
FIG. 3 is an explanatory diagram of the effect of the light source apparatus according to the first embodiment.

The effect of the light source apparatus according to the present embodiment will be described below with reference to FIG. 3. FIG. 3 shows graphs illustrating how the output of the wavelength-converted light (shown as the light output in the figure) and the electrical signal to the polarization adjusting means 2 change. FIG. 3(a) shows an example in which a constant electrical signal is supplied to the polarization adjusting means 2, and FIG. 3(b) shows an example in which the electrical signal to the polarization adjusting means 2 is varied, thereby controlling the polarization adjusting means 2 so that the output of the wavelength-converted light is maintained constant, as in the first embodiment.

As can be seen from FIG. 3, optical noise in the wavelength-converted light, such as shown in FIG. 3(a), is eliminated in FIG. 3(b). In the example of FIG. 3(a), the stability of the light output is 6.2% pp, while in FIG. 3(b), the stability of the light output improves to 0.5% pp. In this way, according to the present invention, the optical noise in the wavelength-converted light passed through the spatial coherence degrading means 5 is reduced by a factor of 12 or more.

Embodiment 2

Figure 4:
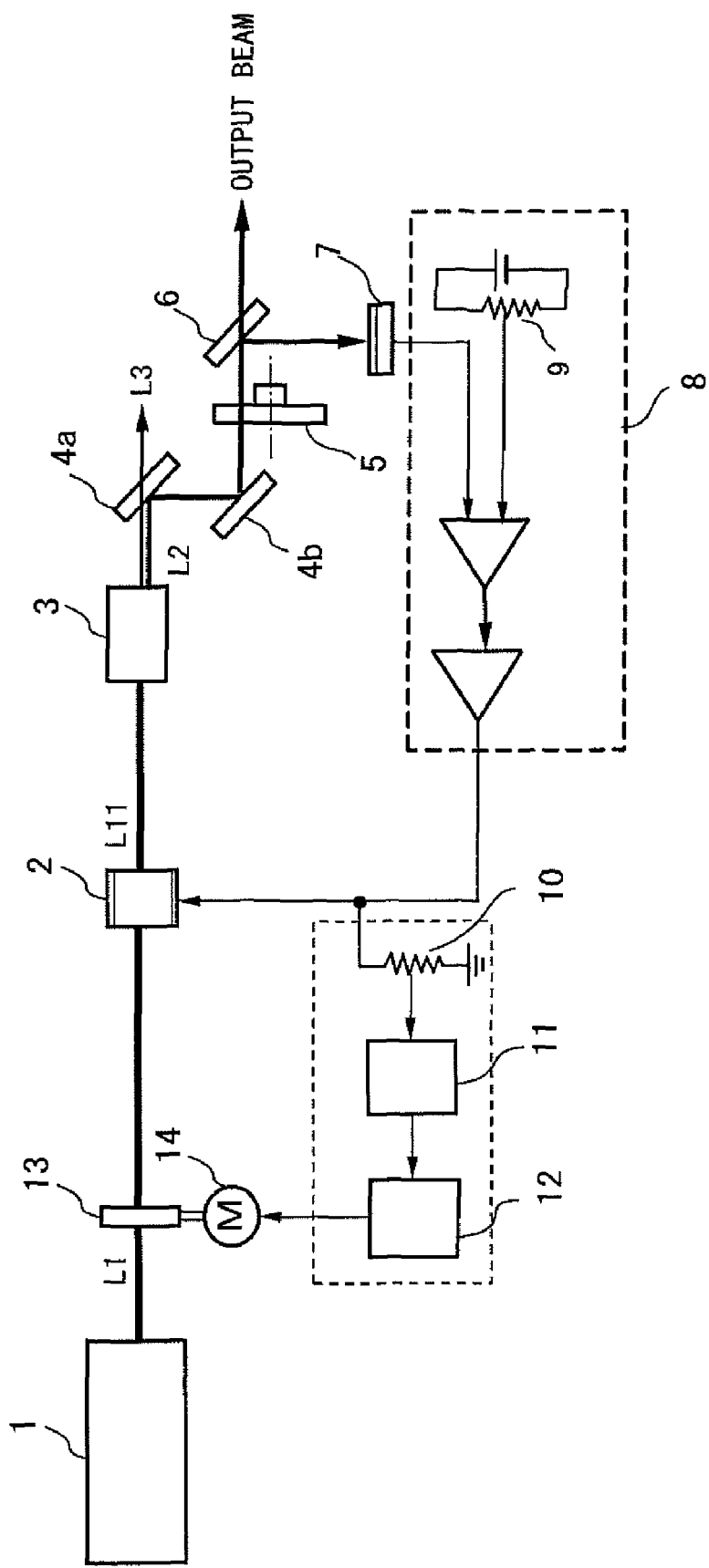
FIG. 4 is a diagram showing the configuration of a light source apparatus according to a second embodiment.

A light source apparatus according to a second embodiment of the present invention will be described below with reference to FIG. 4. FIG. 4 is a diagram showing the configuration of the light source apparatus according to the second embodiment. In FIG. 4, the same component elements as those in FIG. 1 are designated by the same reference numerals, and the description of such component elements will not be repeated here.

As shown in FIG. 4, the configuration of the light source apparatus of the present embodiment differs from that of the light source apparatus shown in FIG. 1 by the inclusion of a voltage dividing circuit 10, a computer 11, a motor controller 12, a half-wave plate 13 and a motor 14. The half-wave plate 13 is arranged between the laser light source 1 and the polarization adjusting means 2 and is rotated about the optical axis by the motor 14.

The half-wave plate 13 is one that introduces a phase difference of Π (180 degrees), and has the function of rotating the plane of the linearly polarized light. The angle of rotation is adjusted by the angle that the slow axis of the half-wave plate 13 makes with the direction of polarization of the incident light. For example, when the half-wave plate 13 is oriented so that its slow axis makes an angle of 45 degrees relative to the linearly polarized incident light, the plane of polarization of the incident light is rotated at 90 degrees.

The half-wave plate 13 is rotated about the optical axis by a rotation driving mechanism such as the motor 14. By rotating the half-wave plate 13, the angle through which the plane of polarization of the incident light is rotated is varied, But, when the half-wave plate is set such shat the slow axis of the half-wave plate is parallel or perpendicular to the plane of polarization of the incident laser beam, the plane of polarization of the incident laser beam dose not rotates. In this case, if the nonlinear optical crystal is arranged such that all the polarized components of the incident laser beam contribute to the wavelength conversion, the polarized component which contributes to the wavelength conversion is decreased by changing the angle between the slow axis of the half-wave plate and the plane of polarization of the incident beam from zero. And, when the half-wave plate is rotated so that the angle between the slow axis of the half-wave plate and the plane of polarization of the incident beam is 45 degrees, the output of the wave-conversion is decreased to zero. That is, the amount of the polarized component that contributes to the wavelength conversion in the nonlinear optical crystal 3 changes according to the rotation of the half-wave plate 13. By rotating the half-wave plate 13, the output of the wavelength-converted light L2 is adjusted.

In this embodiment, a polarizer may also be provided on the exit side of the polarization adjusting means 2, as previously described. The polarizer can be disposed so that its transmittance becomes maximum when the applied voltage to the polarization adjusting means 2 is 0, and so that the polarized component of the transmitted light is wavelength-converted by phase matching in the nonlinear optical crystal 3. In this case, the transmittance T of the polarizer is given by the following equation (2).

$$T = \cos^2\left(\frac{\Gamma}{2}\right) = \cos^2\left(\frac{\pi}{2}\frac{V}{V_\pi}\right) \quad (2)$$

Of course, as earlier described, the polarizer need not necessarily be provided.

The voltage dividing circuit 10 is connected between the output of the controller 8 and the polarization adjusting means 2. The voltage applied to the polarization adjusting means 2 is input to the voltage dividing circuit 10, which outputs a divided voltage. The computer 11 and the motor controller 12 are provided between the voltage dividing circuit 10 and the driving means of the half-wave plate 13.

The computer 11 monitors the divided voltage output from the voltage dividing circuit 10, and supplies a control signal for controlling the angle of the half-wave plate 13 to the motor controller 12 so that the value of the divided voltage becomes substantially equal to one half of the voltage applied to the polarization adjusting means 2. Based on the control signal from the computer 11, the motor controller 12 controls the driving means of the half-wave plate 13.

Thus, the voltage applied to the polarization adjusting means 2 is maintained substantially constant. The voltage applied to the polarization adjusting means 2 is changed only when there occurs, in the output of the wavelength-converted light L2, a change that is so rapid that the rotation of the half-wave plate 13 by a motor or like means cannot follow it. That is, in the illustrated configuration, the voltage to be applied to the polarization adjusting means 2 need only be set just large enough to compensate for the fluctuation of the wavelength-converted output expected to occur due to various factors.

Supposing, for example, that there is optical noise of the ±4% in the light output generated by fourth-harmonic generation, the voltage that needs to be applied to the polarization adjusting means 2 is, at maximum, about 1% of $V_\pi$. In the conventional polarization adjusting means 2, $V_\pi$ is several kilovolts, but in the present embodiment, a voltage of several tens of volts, or at most 100 volts, will suffice for the purpose, thus obviating the need for a high-voltage power supply circuit.

In this way, according to the present embodiment, in an ultraviolet light source achieved by multi-stage wavelength conversion using a high repetition pulsed laser, it becomes possible to not only reduce power consumption but also achieve short-term and long-term output stability. While the above description has dealt with an example in which the phase retardation plate is constructed from a half-wave plate, it will be recognized that the phase difference need not necessarily be set exactly equal to one half wavelength.

Figure 5:
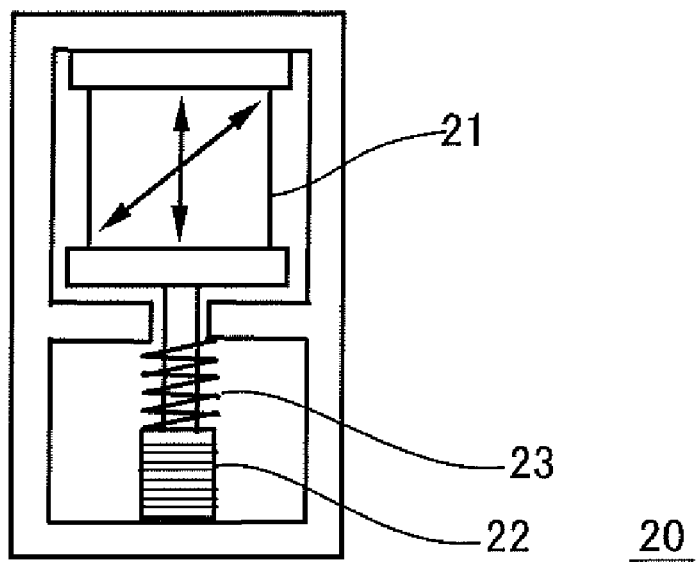
FIG. 5 shows another example of the polarization adjusting means used in the light source apparatus of the present invention.

FIG. 5 shows another example of the polarization adjusting means 2 used in the light source apparatus of the present invention. The polarization adjusting means 20 shown in FIG. 5 is an optical device constructed using a photoelastic member that changes its refractive index by the photoelastic effect. As shown in FIG. 5, the polarization adjusting means 20 includes, in addition to the photoelastic member 21, a piezoelectric element 22 and a spring 23. In FIG. 5, the solid arrow indicates the direction of polarization of incident light, and the dashed arrow indicates the direction of stress.

The photoelastic member is a substance in which, when subjected to an external force, the refractive index of the substance changes due to the photoelastic effect in accordance with the magnitude and direction of strain, thus changing the magnitude and direction of double refraction. This phenomenon is called stress birefringence or photoelastic birefringence. Usually, most solid substances, including optical glass, are photoelastic.

When stress is applied to the photoelastic member 21, the refractive index for polarized light having a plane of polarization parallel to the direction of the stress changes, and also the refractive index for polarized light having a plane of polarization perpendicular to that direction changes. When linearly polarized light having a plane of polarization tilted 45 degrees relative to the direction of the stress is incident, as shown in FIG. 5, double refraction occurs that causes a phase difference between the components polarized parallel and perpendicular to the direction of the stress, disrupting the linearly polarized state of the incident light, and the emergent light generally becomes elliptically polarized light.

The degree of polarization of the emergent light can be changed fast enough by changing the magnitude of the applied stress. Even if uniform birefringence cannot be formed over the entire surface of the photoelastic member 21, a slight change can be caused in the polarized component to be input to the nonlinear optical crystal 3 that follows.

In the example shown in FIG. 5, the piezoelectric element 22 is used as a source for generating the stress to be applied to the photoelastic member 21. The piezoelectric element 22 is an element that utilizes the piezoelectric effect by which the voltage applied to the piezoelectric crystal is converted into stress. By using the piezoelectric element 22, any quick output change on the order of several tens of kilohertz can be addressed, as in the case of the polarization adjusting means 2 that utilizes the electro-optical effect.

According to the present invention, an output stability of ±0.5% or better for both short and long terms can be achieved using simple means, and an ultraviolet light source apparatus based on wavelength conversion, suitable for semiconductor inspection, etc., can be realized. The invention is particularly effective in compensating for output instability that becomes pronounced in fourth-harmonic generation at a wavelength of 266 nm or fifth-harmonic generation at a wavelength of 213 nm which is achieved by multi-stage wavelength conversion using a multimode, high repetition pulsed Nd:YAG laser, Nd:YVO4 laser, fiber laser, etc. as a pump laser light source.

Furthermore, even in cases where an output fluctuation or optical noise occurs due to the provision of the spatial coherence degrading means 5, such as a rotating diffusion plate, to reduce speckle, it becomes possible to obtain wavelength-converted light of stable output.

Figure 6:
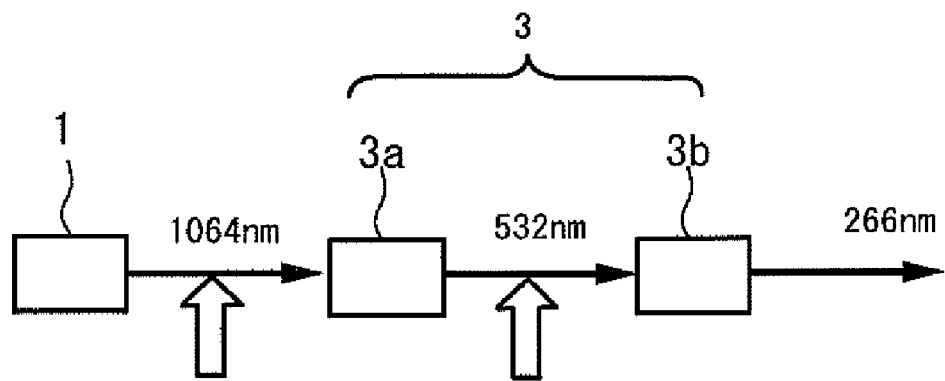
FIG. 6 is an explanatory diagram of an example of how nonlinear optical crystals are arranged and on which laser light the polarization adjusting means is configured to act.
Figure 7:
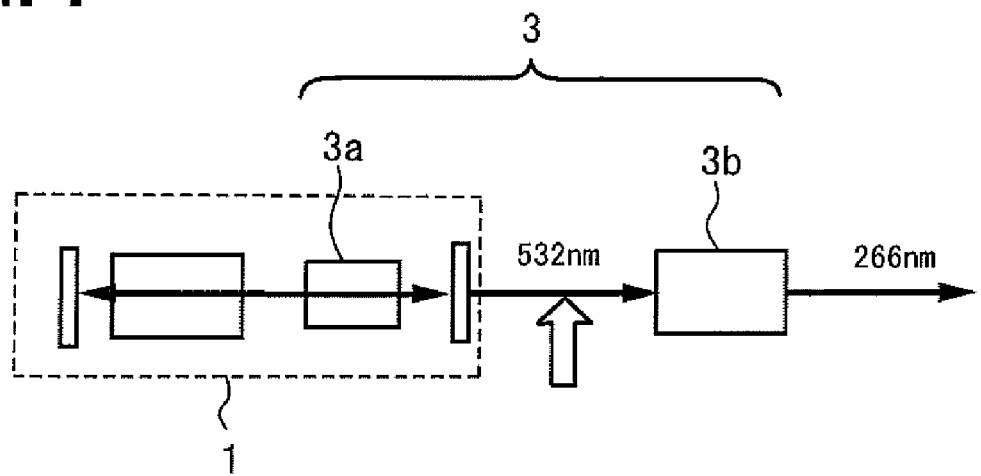
FIG. 7 is an explanatory diagram of an example of how nonlinear optical crystals are arranged and on which laser light the polarization adjusting means is configured to act.
Figure 8:
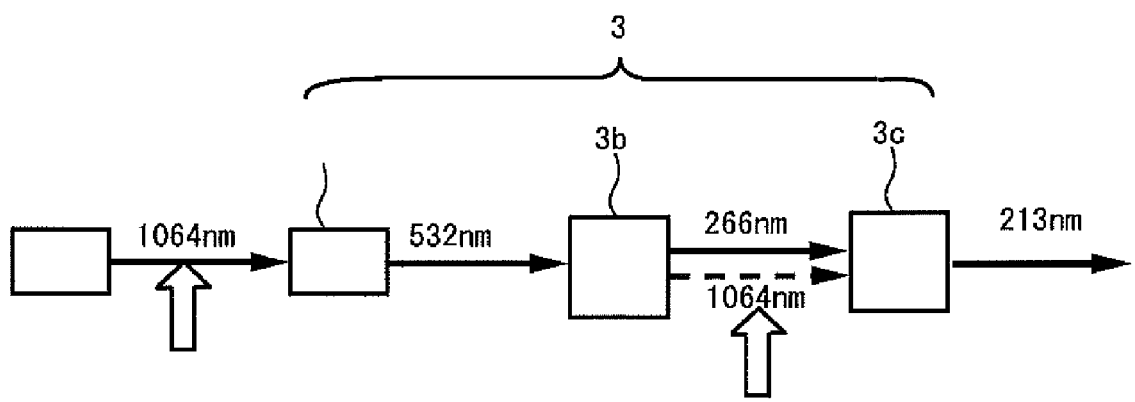
FIG. 8 is an explanatory diagram of an example of how nonlinear optical crystals are arranged and on which laser light the polarization adjusting means is configured to act.

The above embodiment has been described for the case where the polarization adjusting means 2 is applied to the fundamental light of a wavelength from 1030 nm to 1080 nm that the laser light source 1 emits. However, the present invention is not limited to this particular configuration. Referring to FIGS. 6 to 8, the laser light to which an example of the arrangement of the nonlinear optical crystal 3, and the polarization adjusting means 2 are applied will be described. It is assumed here that the laser light source 1 emits laser light at a wavelength of 1064 nm.

In the example shown in FIG. 6, the nonlinear optical crystal 3 includes a first nonlinear optical crystal 3a and a second nonlinear optical crystal 3b. The first nonlinear optical crystal 3a and the second nonlinear optical crystal 3b are both placed outside the laser light source 1.

The laser light L1 at a wavelength of 1064 nm emitted from the laser light source 1 is converted by the first nonlinear optical crystal 3a into second-harmonic light at a wavelength of 532 nm. The second-harmonic light from the first nonlinear optical crystal 3a is converted by the second nonlinear optical crystal 3b into fourth-harmonic light at a wavelength of 266 nm. That is, in the illustrated example, laser light of 270 nm or less is output as the wavelength-converted light by fourth-harmonic generation.

The polarization adjusting means 2 can acts on the fundamental light or on the second-harmonic light at a wavelength of 532 nm. When the polarization adjusting means 2 acts on the second-harmonic light, the polarized component of the second-harmonic light that contributes to the wavelength conversion in the second nonlinear optical crystal 3b can be adjusted. Here, the first nonlinear optical crystal 3a may be placed inside the resonator forming the laser light source 1, as shown in FIG. 7.

In the example shown in FIG. 8, the nonlinear optical crystal 3 includes a first nonlinear optical crystal 3a, a second nonlinear optical crystal 3b, and a third nonlinear optical crystal 3c. The first nonlinear optical crystal 3a, the second nonlinear optical crystal 3b, and the third nonlinear optical crystal 3c are placed outside the laser light source 1.

The laser light at a wavelength of 1064 nm emitted from the laser light source 1 is converted by the first nonlinear optical crystal 3a into second-harmonic light at a wavelength of 532 nm. The second-harmonic light is converted by the second nonlinear optical crystal 3b into fourth harmonic light at a wavelength of 266 nm. The fourth-harmonic light and the residual fundamental light of a 1064 nm wavelength enter the third nonlinear optical crystal 3c.

The third nonlinear optical crystal 3c outputs laser light at a wavelength of 213 nm by sum-frequency mixing between the fourth-harmonic light and the residual fundamental light. That is, in the illustrated example, ultraviolet light of 216 nm or less, generated by the sum-frequency mixing of the fourth-harmonic light and the residual fundamental light, is output as the wavelength-converted light.

As shown in FIG. 8, the polarization adjusting means 2 acts on the fundamental light or on the second-harmonic light at a wavelength of 532 nm or the third-harmonic light at a wavelength of 266 nm. When the polarization adjusting means 2 acts on the second-harmonic light, the polarized component of the second-harmonic light that contributes to the wavelength conversion in the second nonlinear optical crystal 3b can be adjusted. When the polarization adjusting means 2 acts on the fourth-harmonic light, the polarized component of the fourth-harmonic light that contributes to the wavelength conversion in the third nonlinear optical crystal 3c can be adjusted.

Figure 9:
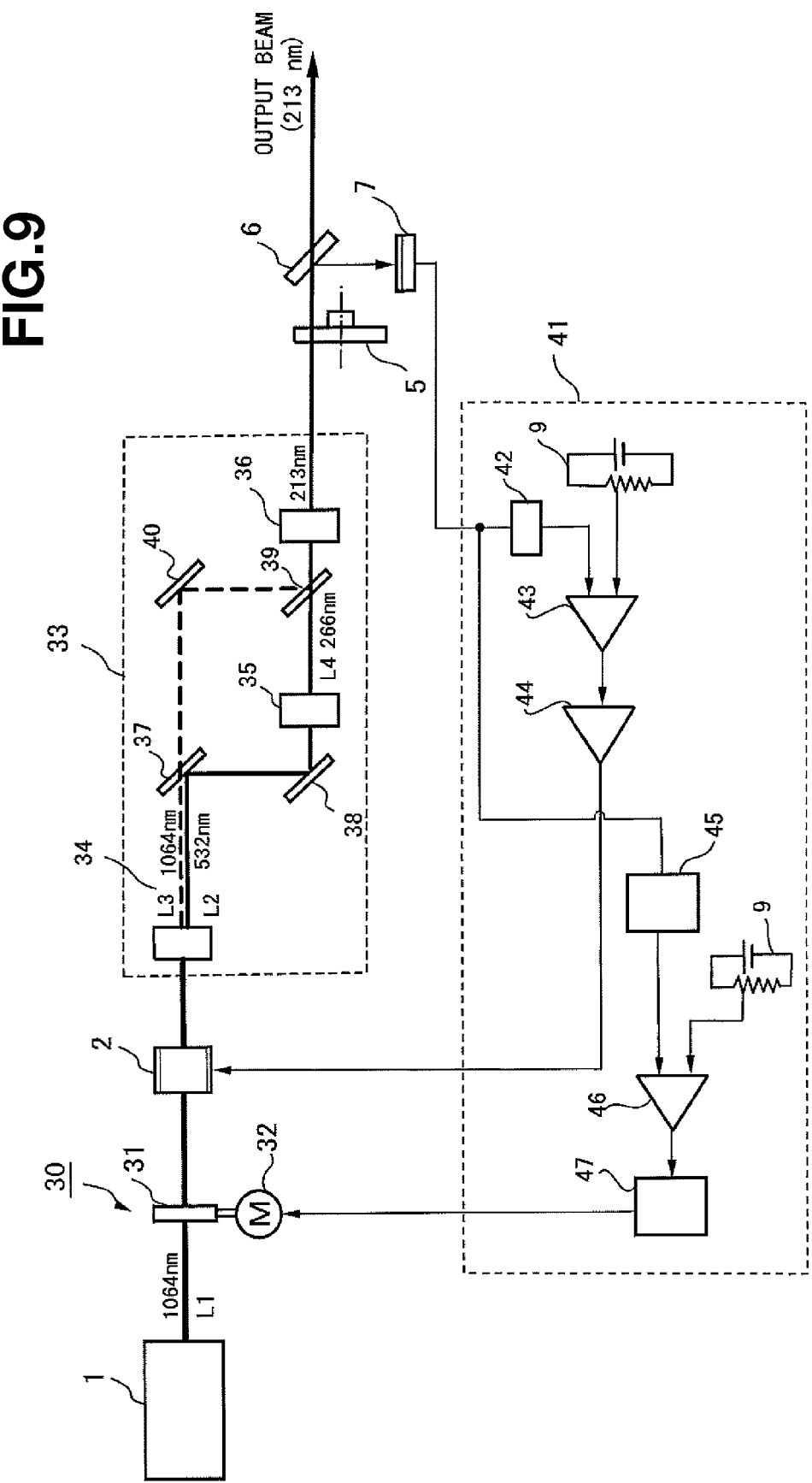
FIG. 9 is a diagram showing the configuration of a light source apparatus according to a third embodiment.

FIG. 9 illustrates the third embodiment of the invention. In FIG. 9, the same component element as those used in FIG. 4 are designated by the same reference numerals. The light source apparatus according to this embodiment produces the fifth harmonic laser beam whose high frequency and low frequency components are both stabilized. The laser device 1 produces the fundamental laser beam L1. This laser beam is linearly polarized light whose wavelength is 1064 nm. Such laser device comprises a solid state laser which is selected from a group of a Nd:YAG laser, a Nd:YVO laser, Nd:YLF laser, and a fiber laser.

The laser beam L1 is directed onto the second polarization adjusting means 30. Such second polarization adjusting means 30 act to stabilize the change of the low frequency component of the output beam at low speed. The second polarization adjusting means 30 comprises the half-wave plate 31 and the motor 32 for rotating the half-wave plate 31 about the optical axis. By rotating the half-wave plate 31, the polarization plane of the incident fundamental laser beam is rotated so that the amount of the polarized component which is phase matched to the nonlinear optical crystals is changed according to the rotation angle of the half-wave plate 31. Namely, when the intensity of the output beam is lower than the reference value, the second polarization adjusting means adjusts the polarization plane of the fundamental laser beam so that the amount of the polarized component which is phase matched to the nonlinear optical crystals increases, and when the intensity of the output beam is higher than the reference value, the second polarization adjusting means adjusts the polarization plane of the fundamental laser beam so that the amount of the polarized component which is phase matched to the nonlinear optical crystals decreases. Therefore, by controlling the rotation angle of the half-wave plate 31, the polarization state of the fundamental laser beam is adjusted so that the amount of the polarized component which is to be converted by the nonlinear optical crystals can be adjusted.

The fundamental laser beam emitted from the half-wave plate 31 impinges onto the first polarization adjusting means 2. The first polarization adjusting means 2 act to stabilize the change of the high frequency components of the output beam at high speed. The first polarization adjusting means 2 comprises an electro-optical modulator which controls the polarization state of the incident laser beam according to the control voltage signal at high speed. Namely, by adjusting the control voltage applied to the electro-optical modulator 2, the amount of the polarized component which is phase matched to the nonlinear optical crystals is adjusted according to the control voltage so that the change of the high frequency component of the output beam is stabilized at high speed. Namely, when the intensity of the output beam is lower than the reference value, the electro-optical modulator 2 adjusts the polarization plane of the fundamental laser beam so that the amount of the polarized component which is phase matched to the nonlinear optical crystals increases, and when the intensity of the output beam is higher than the reference value, it adjusts the polarization plane of the fundamental laser beam so that the amount of the polarized component which is phase matched to the nonlinear optical crystals decreases. In this way, according to the invention, the polarization state of the fundamental laser beam is controlled with two phases.

The fundamental laser beam emitted from the first polarization adjusting means 2 is directed onto a nonlinear optical crystal group 33. The nonlinear optical crystal group 33 comprises a first, second and third nonlinear optical crystals 34, 35 and 36. For example, the first nonlinear optical crystal 34 comprises $LBO(LiB_3O_5)$, and the second and third nonlinear optical crystals comprise $CLBO(CsLiB_6O_{10})$. The first nonlinear optical crystal 34 converts the incident fundamental laser beam to produce the second harmonic laser beam L2 whose wavelength is 532 nm. The second harmonic laser beam and the residual fundamental laser beam L3 which is not converted strike on the first dichroic mirror 37. The dichroic mirror 37 acts to transmit the residual fundamental laser beam L3 and to reflect the second harmonic laser beam L2.

The second harmonic laser beam L2 is reflected by the first dichroic mirror 37 and a total reflection mirror 38 and is directed onto the second nonlinear optical crystal 35. The second nonlinear optical crystal 35 converts the second harmonic laser beam L2 to produce the fourth harmonic laser beam L4 whose wavelength is 266 nm. The fourth harmonic laser beam L4 impinges onto the second dichroic mirror 39. The fundamental laser beam L3 emitted from the first nonlinear optical crystal 34 is transmitted through the first dichroic mirror 37 and is reflected by a total reflection mirror 40 and impinges onto the second dichroic mirror 39.

The second dichroic mirror 39 acts to reflect the fundamental laser beam L3 and to transmit the fourth laser beam L4. Therefore, the fundamental laser beam and the fourth harmonic laser beam are combined with each other by the second dichroic mirror 39. The combined beam impinges onto the third nonlinear optical crystal 36. The third nonlinear optical crystal 36 performs sum-frequency mixing between the fourth harmonic laser beam and the fundamental laser beam to produce the fifth harmonic laser beam whose wavelength is 213 nm.

The fifth harmonic laser beam emitted from the third nonlinear optical crystal 36 impinges onto the spatial coherence degrading means 5. The spatial coherence degrading means 5 comprises a rotating diffusion plate which functions as speckle noise reducing means. The speckle noise reducing means emits the fifth harmonic laser beam in which the speckle noise is suppressed. Such fifth harmonic laser beam impinges onto the partial reflective mirror 6. The transmitted beam portion through the partial reflective mirror 6 is emitted as the output beam whose wavelength is 213 nm. The reflected beam portion by the partial reflective mirror 6 is directed onto the photodetector 7. The photodetector 7 outputs the electric signal whose amplitude corresponds to the intensity of the output beam.

The output signal of the photodetector 7 is supplied to the control means 41. The control means 41 produces the first control signal for controlling the first polarization adjusting means 2 and a second control signal for controlling the second polarization adjusting means 30 by use of the output signal from the photodetector 7. The output signal from the photodetector 7 is supplied to a high pass filter 42 to derive a high frequency component of the output signal. The high frequency signal is supplied to a differential amplifier 43. The differential amplifier 43 detects the difference between the output signal of the photodetector 7 and the reference signal to produce the difference signal. Detected difference signal of the high frequency component is supplied to the amplifier 44. The amplifier 44 produces the control voltage signal based on the difference signal. The produced control voltage signal is supplied to the electro-optical modulator 2. Then, the electro-optical modulator 2 adjusts the polarization state of the fundamental laser beam based on the control voltage signal so that the intensity of the output beam is maintained to a constant value. Thereby, the change of high frequency component of the output beam is stabilized.

The output signal of the photodetector 7 is also supplied to the low pass filter 45 to derive a low frequency component of the output signal, such low frequency signal is supplied to a differential amplifier 46. The differential amplifier 46 detects the difference between the output signal of the photodetector 7 and the reference signal to produce a difference signal. Detected difference signal of the low frequency component is supplied to the amplifier 47. The amplifier 47 produces the motor driving signal based on the difference signal. The motor driving signal is supplied to the motor 32. Then, the motor 32 rotates the half-wave plate 31 to adjust the polarization state of the fundamental laser beam such that the intensity of the output beam is maintained to a constant value. Thereby, the change of low frequency component of the output beam is stabilized. It should be noted that the second polarization adjusting means 30 of the half-wave plate and the motor may be replaced with the electro-optical modulator.

In this way, the light source apparatus according to the invention comprises the first polarization adjusting means for suppressing the change of the high frequency component of the output harmonic beam at high speed and the second polarization adjusting means for suppressing the change of the low frequency component of the output harmonic beam at low speed, and therefore it becomes possible to suppress long-time output fluctuation and to compensate for high-frequency noise on the order of kHz.

The present invention is not limited to the specific embodiments described above, but suitable changes may be made without departing from the spirit and scope of the invention.

What is claimed is:

1. A light source apparatus, comprising: a laser source for producing a fundamental laser beam; a first nonlinear optical crystal converting the incident laser beam to produce a harmonic laser beam; first polarization adjusting means arranged in the optical path between the laser source and the first nonlinear optical crystal and adjusting the polarization state of the incident laser beam based on a first control signal at high speed; second polarization adjusting means arranged in the optical path between the laser source and the first nonlinear optical crystal and adjusting the polarization state of the incident laser beam based on a second control signal at low speed than the first polarization adjusting means; a photodetector receiving a part of the output beam emitted from the first nonlinear optical crystal to produce an electric signal corresponding to the intensity of the output beam; and control means for producing the first and second control signals used to control respectively the first and second polarization adjusting means using the output electric signal from the photodetector.

2. A light source apparatus according to claim 1, said apparatus further comprising: a second nonlinear optical crystal arranged in the optical path between the laser source and the first nonlinear optical crystal and converting the incident fundamental laser beam to produce a harmonic laser beam, wherein the first nonlinear optical crystal acts on the harmonic laser beam emitted from the second nonlinear optical crystal to produce a fourth harmonic laser beam.

3. A light source apparatus according to claim 2, wherein the first polarization adjusting means acts to stabilize the change of the high frequency component of the output beam, and the second polarization adjusting means acts to stabilize the change of the low frequency component of the output beam.

4. A light source apparatus according to claim 3, wherein the first polarization adjusting means comprises an electro-optical modulator which changes the polarization state of the incident laser beam according to the control voltage signal supplied from the control means, and the second polarization adjusting means comprises a half-wave plate and a motor for rotating the half-wave plate.

5. A light source apparatus according to claim 4, wherein the fourth harmonic laser beam is ultraviolet light of 270 nm or shorter.

6. A light source apparatus, comprising: a laser source for producing a fundamental laser beam; a nonlinear optical crystal group comprising a first, second and third nonlinear optical crystals and converting the incident fundamental laser beam to produce a fifth harmonic laser beam; first polarization adjusting means arranged in the optical path between the laser source and the nonlinear optical crystal group and adjusting the polarization state of the incident laser beam based on a first control signal at high speed; second polarization adjusting means arranged in the optical path between the laser source and the first nonlinear optical crystal and adjusting the polarization state of the incident laser beam based on a second control signal at low speed than the first polarization adjusting means; a photodetector receiving a part of the output beam emitted from the nonlinear optical crystal group to produce an electric signal corresponding to the intensity of the output beam; and control means for producing the first and second control signals used to control respectively the first and second polarization adjusting means using the output electric signal from the photodetector.

7. A light source apparatus according to claim 6, wherein the first polarization adjusting means acts to stabilize the change of the high frequency component of the output beam, and the second polarization adjusting means acts to stabilize the change of the low frequency component of the output beam.

8. A light source apparatus according to claim 7, wherein the first polarization adjusting means comprises an electro-optical modulator which changes the polarization state of the incident laser beam according to the control voltage signal supplied from the control means, and the second polarization adjusting means comprises a half-wave plate and a motor for rotating the half-wave plate.

9. A light source apparatus according to claim 6, wherein the second polarization adjusting means receives the fundamental laser beam emitted from the laser source and the first polarization adjusting means receives the polarization adjusted fundamental laser beam emitted from the first polarization adjusting means.

10. A light source apparatus according to claim 6, wherein the first nonlinear optical crystal of the nonlinear optical crystal group receives the fundamental laser beam and converts the incident fundamental laser beam to emit a second harmonic laser beam and the fundamental laser beam, the second nonlinear optical crystal converts the second harmonic laser beam to produce a fourth harmonic laser beam, and the third nonlinear optical crystal receives the fundamental laser beam emitted from the first nonlinear optical crystal and the fourth harmonic laser beam emitted from the second nonlinear optical crystal and performs sum-frequency mixing of the fundamental laser beam and the fourth harmonic laser beam to produce a fifth harmonic laser beam.

11. A light source apparatus according to claim 10, wherein said first, second and third nonlinear optical crystals comprises LBO, CLBO and CLBO, respectively.

12. A light source apparatus according to claim 6, wherein said laser source comprises a solid state laser.

13. A light source apparatus according to claim 12, wherein said solid state laser is selected from a group of a Nd:YAG laser, a Nd:YVO laser, Nd:YLF laser, and a fiber laser.

14. A light source apparatus according to claim 6, wherein the wavelength of the fundamental laser beam is in the range of 1030 to 1080 nm, and the fifth harmonic laser beam is ultraviolet light of 216 nm or shorter.

15. A light source apparatus according to claim 14, wherein the wavelength of the fifth harmonic laser beam is 213 nm.

16. A light source apparatus according to claim 6, said apparatus further comprising: speckle noise reducing means for receiving the fifth harmonic laser beam emitted from the nonlinear optical crystal group and for suppressing the speckle noise.

17. A light source apparatus according to claim 16, wherein said speckle noise reducing means comprise a rotating diffusion plate.

* * * * *